(12) United States Patent
Jing et al.

(10) Patent No.: US 11,249,584 B2
(45) Date of Patent: Feb. 15, 2022

(54) TOUCH SUBSTRATE, MANUFACTURING METHOD THEREOF AND TOUCH SCREEN

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ruikuan Jing, Beijing (CN); Teng Jin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 758 days.

(21) Appl. No.: 16/071,135

(22) PCT Filed: Nov. 15, 2017

(86) PCT No.: PCT/CN2017/111019
§ 371 (c)(1),
(2) Date: Jul. 19, 2018

(87) PCT Pub. No.: WO2018/196342
PCT Pub. Date: Nov. 1, 2018

(65) Prior Publication Data
US 2021/0165514 A1 Jun. 3, 2021

(30) Foreign Application Priority Data
Apr. 26, 2017 (CN) .......................... 201710282149.7

(51) Int. Cl.
*G06F 3/041* (2006.01)

(52) U.S. Cl.
CPC ........ *G06F 3/04164* (2019.05); *G06F 3/0412* (2013.01); *G06F 2203/04103* (2013.01)

(58) Field of Classification Search
None
See application file for complete search history.

(56) References Cited

U.S. PATENT DOCUMENTS

2013/0162570 A1* 6/2013 Shin .................. G02F 1/133345
345/173
2014/0152938 A1* 6/2014 Lee ...................... G09G 3/3648
349/46

(Continued)

FOREIGN PATENT DOCUMENTS

| CN | 101697053 A | 4/2010 |
| CN | 104808411 A | 7/2015 |

(Continued)

OTHER PUBLICATIONS

Search Report and Written Opinion for International Application No. PCT/US2017/111019 dated Feb. 23, 2018.

(Continued)

*Primary Examiner* — Brian M Butcher
(74) *Attorney, Agent, or Firm* — Calfee, Halter & Griswold LLP (57) ABSTRACT

Embodiments of the present disclosure provide a touch substrate comprising a display area and a non-display area on the periphery of the display area. In the non-display area of the touch substrate, an orthographic projection of the touch signal line on the substrate intersects with orthographic projections of the gate signal line and the source-drain signal line on the substrate, respectively. In an intersection region where the orthographic projection of the touch signal line on the substrate intersects with the orthographic projections of the gate signal line and the source-drain signal line on the substrate, the orthographic projection (Continued)

of the source-drain signal line on the substrate at most covers an orthographic projection of one of the first side and the second side of the gate signal line on the substrate. Embodiments of the present disclosure further provide a method for manufacturing a touch substrate as well as a touch screen.

13 Claims, 4 Drawing Sheets

(56) References Cited

U.S. PATENT DOCUMENTS

| | | |
|---|---|---|
| 2017/0031520 A1 | 2/2017 | Kang et al. |
| 2017/0146876 A1 | 5/2017 | Ming et al. |
| 2019/0034012 A1 | 1/2019 | Xie et al. |

FOREIGN PATENT DOCUMENTS

| | | |
|---|---|---|
| CN | 105116648 A | 12/2015 |
| CN | 105468202 A | 4/2016 |
| CN | 105759525 A | 7/2016 |
| CN | 106155448 A | 11/2016 |
| CN | 106406598 A | 2/2017 |
| CN | 106468972 A | 3/2017 |
| CN | 107092394 A | 8/2017 |
| JP | 2014146283 A | 8/2014 |

OTHER PUBLICATIONS

First Office Action for Chinese Patent Application No. 201710282149.7 dated Apr. 12, 2019.

\* cited by examiner

TOUCH SUBSTRATE, MANUFACTURING METHOD THEREOF AND TOUCH SCREEN

RELATED APPLICATION

The present application is the U.S. national phase entry of PCT/CN2017/111019, with an international filing date of Nov. 15, 2017, which claims the benefit of Chinese Patent Application No. 201710282149.7, filed on Apr. 26, 2017, the entire disclosure of which is incorporated herein by reference.

FIELD

The present disclosure generally relates to the field of display technologies. More specifically, the present disclosure relates to a touch substrate, a touch screen comprising the touch substrate, and a method for manufacturing the touch substrate.

BACKGROUND

The appearance of touch screens greatly enriches the functions of display devices and brings many novel applications. Common capacitive touch screens have advantages such as accurate, sensitive positioning, good hand feeling, long service life, and the like, and thus have been widely used in the touch display field. In terms of the position of the touch substrate in a touch screen, touch screens are generally classified into One Glass Solution (OGS) touch screens, On-Cell touch screens and an In-Cell touch screens. In an OGS touch screen, the touch substrate is integrated on a cover plate, and the cover plate is attached to a display panel. In an On-Cell touch screen, the touch substrate is disposed on an outer surface of a liquid crystal cell, for example, on a surface of a color filter substrate away from the touch substrate. In an In-Cell touch screen, the touch substrate is disposed inside a liquid crystal cell, for example, between a color filter substrate and a liquid crystal layer.

SUMMARY

Embodiments of the present disclosure aim to provide an improved touch substrate, a manufacturing method thereof, and a touch screen.

Typically, a touch substrate comprises a display area having both a display function and a touch function and a non-display area on the periphery of the display area. A touch electrode is disposed in the display area of the touch substrate, and a touch signal line electrically connected to the touch electrode for transmitting a touch signal sensed by the touch electrode to an analysis chip is disposed in the non-display area. A gate signal line and a source-drain signal line providing display signals extend in both the display area and the non-display area of the touch substrate. In general, in the display area, extending directions of the gate signal line and the source-drain signal line intersect with each other so as to implement progressive scanning of a pixel array in the display area. In the non-display area, however, the extending directions of the gate signal line and the source-drain signal line are parallel, and the orthographic projections thereof on a substrate at least partially overlap. Reasons are as follows. In order to ensure the attaching effect between the touch substrate and an upper substrate, a sealant in the non-display area needs to be irradiated with UV light, and the gate signal line and the source-drain signal line are usually not light-transmissive. Therefore, in order to increase the transmittance of the UV light as much as possible so as to ensure the attaching effect, the gate signal line and the source-drain signal line are arranged so that their orthographic projections on the substrate at least partially overlap.

However, the inventors have realized that, since the orthographic projection of the touch signal line on the substrate in the non-display area usually intersects with the orthographic projections of the gate signal line and the source-drain signal line on the substrate, when the orthographic projections of the gate signal line and the source-drain signal line on the substrate at least partially overlap, the touch signal line will have a large mismatch gap when transitioning from an non-intersection region to an intersection region, and vice versa. Such a large mismatch gap will cause crossover open in the touch signal line, thereby affecting the normal operation of the touch substrate.

Accordingly, according to an aspect of the present disclosure, there is provided a touch substrate comprising a display area and a non-display area on the periphery of the display area. The non-display area of the touch substrate includes a substrate, a gate signal line disposed on the substrate, a source-drain signal line disposed above the gate signal line and electrically insulated therefrom, and a touch signal line disposed above the source-drain signal line and electrically insulated therefrom. The gate signal line has a first side and a second side opposite to each other in a direction perpendicular to its own extending direction. In the non-display area of the touch substrate, an orthographic projection of the touch signal line on the substrate intersects with orthographic projections of the gate signal line and the source-drain signal line on the substrate, respectively. In an intersection region where the orthographic projection of the touch signal line on the substrate intersects with the orthographic projections of the gate signal line and the source-drain signal line on the substrate, the orthographic projection of the source-drain signal line on the substrate at most covers an orthographic projection of one of the first side and the second side of the gate signal line on the substrate.

As used herein, the "first side" and "second side" of the gate signal line may refer to sides perpendicular to a plane where the gate signal line resides, respectively, but may also refer more generally to sides forming acute angles with the plane where the gate signal line resides, respectively. The expression "the orthographic projection of the source-drain signal line on the substrate at most covers an orthographic projection of one of the first side and the second side of the gate signal line on the substrate" means that the orthographic projection of the source-drain signal line on the substrate only covers the orthographic projection of the first side of the gate signal line on the substrate, or only covers the orthographic projection of the second side of the gate signal line on the substrate, or does not cover the orthographic projection of either of the first side and the second side of the gate signal line on the substrate. In practice, since the gate signal line and the source-drain signal line are usually made of an opaque material, in order to increase the transmittance of the UV light as much as possible so as to ensure the attaching effect, the gate signal line and the source-drain signal line are arranged so that their orthographic projections on the substrate at least partially overlap.

According to some embodiments, in the non-display area, an extending direction of the gate signal line is parallel to that of the source-drain signal line.

According to some embodiments, the orthographic projections of the gate signal line and the source-drain signal line on the substrate overlap with each other in a region of the non-display area other than the intersection region.

According to some embodiments, in the intersection region, the gate signal line is offset with respect to the source-drain signal line in a direction perpendicular to the extending direction of the gate signal line. For example, in the region of the non-display area other than the intersection region, the gate signal line is straight along the extending direction of the gate signal line, and in the intersection region, the gate signal line has a lateral protrusion. Alternatively, for example, in the region of the non-display area other than the intersection region, the source-drain signal line is straight along the extending direction of the source-drain signal line, and in the intersection region, the source-drain signal line has a lateral protrusion. Still alternatively, for example, in the region of the non-display area other than the intersection region, the gate signal line and the source-drain signal line are straight along their own extending directions, and in the intersection region, the gate signal line and the source-drain signal line have lateral protrusions respectively, which protrude in opposite directions.

As used herein, the term "lateral protrusion" refers to a protruding portion of a corresponding signal line in a direction perpendicular to its extending direction. Those skilled in the art will readily understand that, whether the gate signal line or the source-drain signal line has a lateral protrusion, it is possible to make the gate signal line offset with respect to the source-drain signal line in a direction perpendicular to the extending direction of the gate signal line.

According to some embodiments, the offset is at least 20% of the width of the gate signal line.

According to some embodiments, the gate signal line and the source-drain signal line have a same width.

According to some embodiments, the non-display area further includes: a gate insulating layer disposed between the gate signal line and the source-drain signal line, wherein the gate signal line and the source-drain signal line are electrically insulated from each other by the gate insulating layer; a first passivation layer disposed between the source-drain signal line and the touch signal line, wherein the source-drain signal line and the touch signal line are electrically insulated from each other by the first passivation layer; and a second passivation layer disposed on the touch signal line.

According to some embodiments, the display area also includes the substrate. And the display area further includes a gate metal layer disposed on the substrate; a gate insulating layer disposed on the gate metal layer; an active layer and a pixel electrode layer disposed on the gate insulating layer; a source-drain metal layer disposed on the active layer; a first passivation layer disposed on the source-drain metal layer; a second passivation layer disposed on the first passivation layer; and a touch electrode disposed on the second passivation layer. The gate metal layer and the gate signal line are disposed in a same layer, the source-drain metal layer and the source-drain signal line are disposed in a same layer, and the touch electrode is electrically connected to the touch signal line for transmitting a touch signal sensed by the touch electrode to an analysis chip.

According to some embodiments, the touch electrode includes a transparent conductive material, and the first passivation layer and the second passivation layer include a transparent insulating material. The material of the touch electrode may be, for example, a transparent metal, a transparent metal alloy, a transparent metal oxide, carbon nanotubes, and graphene. The materials of the first passivation layer and the second passivation layer may be, for example, an inorganic material such as silicon oxide ($SiO_2$), silicon nitride ($SiN_x$), silicon oxynitride ($SiO_xN_y$), and the like, or an organic material such as resin.

According to another aspect of the present disclosure, there is provided a touch screen, comprising any of the touch substrates described above.

According to a further aspect of the present disclosure, there is provided a method for manufacturing a touch substrate, comprising steps of forming a display area and a non-display area on the periphery of the display area. Forming a non-display area comprises steps of: forming a gate signal line on a substrate, the gate signal line having a first side and a second side opposite to each other in a direction perpendicular to an extending direction of the gate signal line; forming, above the gate signal line, a source-drain signal line electrically insulated from the gate signal line; forming, above the source-drain signal line, a touch signal line electrically insulated from the source-drain signal line. An orthographic projection of the touch signal line on the substrate intersects with orthographic projections of the gate signal line and the source-drain signal line on the substrate, respectively. In an intersection region where the orthographic projection of the touch signal line on the substrate intersects with the orthographic projections of the gate signal line and the source-drain signal line on the substrate, the orthographic projection of the source-drain signal line on the substrate at most covers an orthographic projection of one of the first side and the second side of the gate signal line on the substrate.

According to some embodiments, the step of forming a gate signal line comprises steps of: depositing a gate metal layer on the substrate; coating a photoresist on the gate metal layer, and forming a photoresist pattern by exposure and development; and forming a pattern of the gate signal line on the substrate by wet etching using the photoresist pattern as a mask.

According to some embodiments, the gate signal line, the source-drain signal line, and the touch signal line are made of aluminum or molybdenum.

It is to be understood that the general description above and the detailed description below are exemplary and explanatory only and are not intended to limit the present disclosure in any way.

BRIEF DESCRIPTION OF DRAWINGS

In order to more clearly illustrate the technical solutions in embodiments of the present disclosure, the drawings required for description of the embodiments will be briefly described below. It is obvious that the drawings in the description below are merely some embodiments of the present disclosure.

Through the above-described drawings, specific embodiments of the present disclosure have been shown, which will be described in more detail later. These drawings and textual descriptions are not intended to limit the scope of the present disclosure in any way, but explain the concept of the present disclosure to those ordinarily skilled in the art by referring to specific embodiments.

DETAILED DESCRIPTION

To make the objectives, technical solutions, and advantages of embodiments of the present disclosure clearer, the technical solutions of the embodiments of the present disclosure will be further described below in detail with reference to the accompanying drawings.

Figure 1:
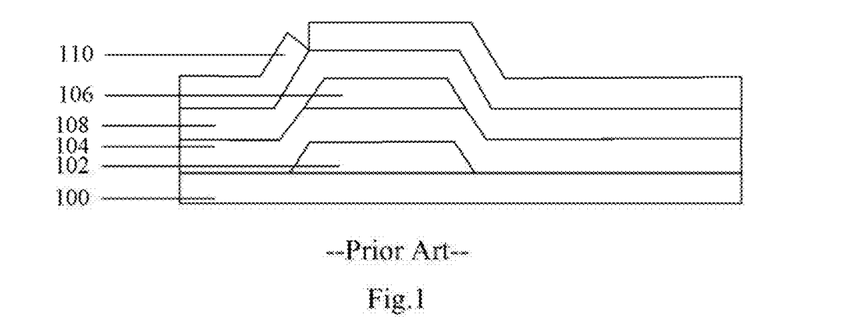
FIG. 1 schematically illustrates a sectional view of a non-display area of a conventional touch substrate.
Figure 2:
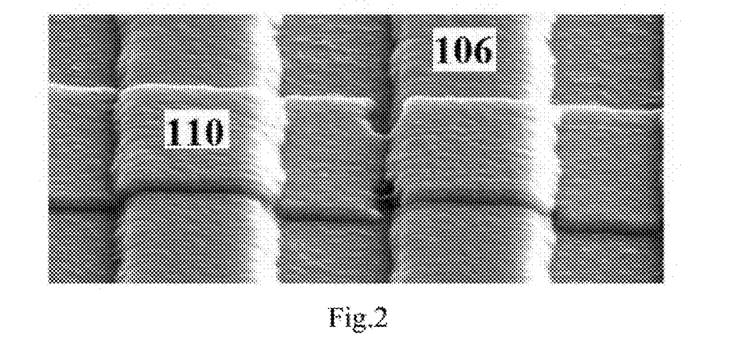
FIG. 2 is a scanning electron microscope image illustrating crossover open in a touch signal line.

FIG. 1 schematically illustrates a sectional view of a non-display area of a conventional touch substrate. As shown in FIG. 1, the non-display area includes a substrate 100, a gate signal line 102 disposed on the substrate 100, a gate insulating layer 104 disposed on the gate signal line 102, a source-drain signal line 106 disposed on the gate insulating layer 104, a first passivation layer 108 disposed on the source-drain signal line 106, and a touch signal line 110 disposed on the first passivation layer 108. As stated above, and as shown in FIG. 1, orthographic projections of the gate signal line 102 and the source-drain signal line 106 on the substrate 100 at least partially overlap in order to ensure the attaching effect between the touch substrate and an upper substrate. However, this potentially increases the mismatch gap of the touch signal line 110 between a non-intersection region and an intersection region. Such a large mismatch gap will lead to crossover open in the touch signal line 110, which increases the difficulty and risk of a film formation process, increases the failure of wiring due to climbing, and further affects the normal operation of the touch substrate. Referring to FIG. 2, which is a scanning electron microscope image illustrating crossover open in a touch signal line, the horizontal band is the touch signal line 110, and the vertical band is the source-drain signal line 106. As can be clearly seen from FIG. 2, there is significant crossover open in the touch signal line 110.

Figure 3A:
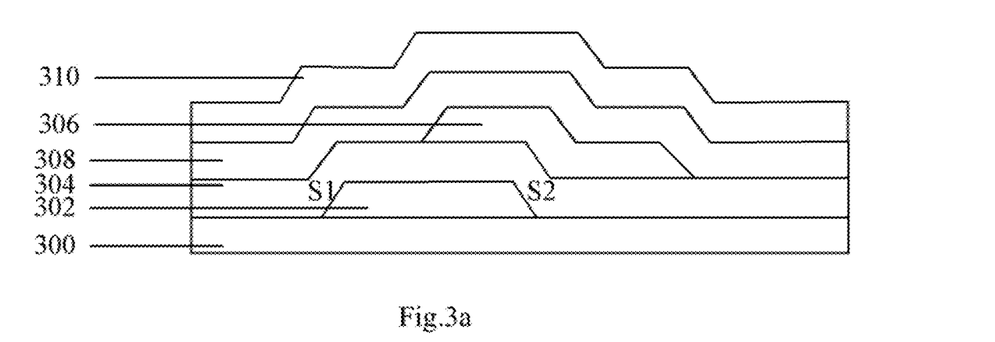
FIG. 3a schematically illustrates a sectional view of a non-display area of a touch substrate according to embodiments of the present disclosure.
Figure 3B:
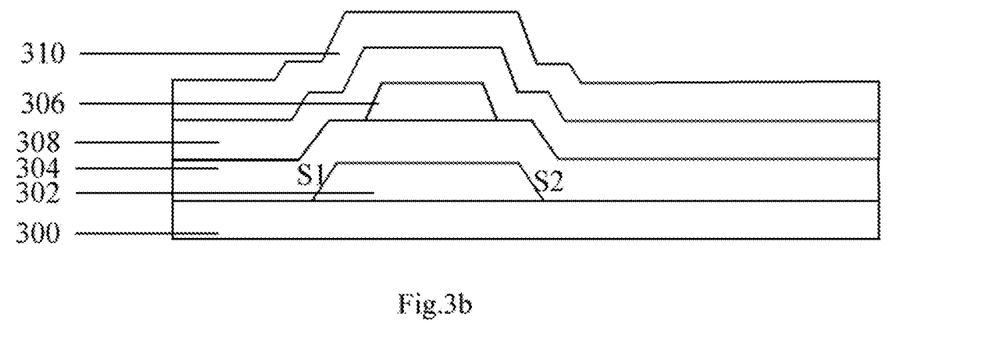
FIG. 3b schematically illustrates a sectional view of a non-display area of a touch substrate according to embodiments of the present disclosure.

With respect to the above issues, embodiments of the present disclosure provide a touch substrate comprising a display area and a non-display area on the periphery of the display area. FIGS. 3a-3b schematically illustrate sectional views of a non-display area of a touch substrate according to embodiments of the present disclosure. As shown in FIGS. 3a-3b, the non-display area of the touch substrate includes a substrate 300, a gate signal line 302 disposed on the substrate 300, a source-drain signal line 306 disposed above the gate signal line 302 and electrically insulated therefrom, and a touch signal line 310 disposed above the source-drain signal line 306 and electrically insulated from therefrom. The non-display area of the touch substrate further includes: a gate insulating layer 304 disposed between the gate signal line 302 and the source-drain signal line 306, wherein the gate signal line 302 and the source-drain signal line 306 are electrically insulated from each other by the gate insulating layer 304; a first passivation layer 308 disposed between the source-drain signal line 306 and the touch signal line 310, wherein the source-drain signal line 306 and the touch signal line 310 are electrically insulated from each other by the first passivation layer 308; and a second passivation layer (not shown in FIGS. 3a-3b) disposed on the touch signal line 310. The gate signal line 302 has a first side S1 and a second side S2 opposite to each other in a direction perpendicular to its own extending direction (i.e. horizontal direction in the orientation of FIGS. 3a-3b). In the non-display area of the touch substrate, an orthographic projection of the touch signal line 310 on the substrate 300 intersects with orthographic projections of the gate signal line 302 and the source-drain signal line 306 on the substrate 300, respectively. In an intersection region where the orthographic projection of the touch signal line 310 on the substrate 300 intersects with the orthographic projections of the gate signal line 302 and the source-drain signal line 306 on the substrate 300, the orthographic projection of the source-drain signal line 306 on the substrate 300 at most covers an orthographic projection of one of the first side S1 and the second side S2 of the gate signal line 302 on the substrate 300. For example, as shown in FIG. 3a, the orthographic projection of the source-drain signal line 306 on the substrate 300 covers only the orthographic projection of the second side S2 of the gate signal line 302 on the substrate 300. Of course, the orthographic projection of the source-drain signal line 306 on the substrate 300 may also cover only the orthographic projection of the first side S1 of the gate signal line 302 on the substrate 300. Alternatively, the orthographic projection of the source-drain signal line 306 on the substrate 300 does not cover the orthographic projection of either of the first side S1 and the second side S2 of the gate signal line 302 on the substrate 300, as shown in FIG. 3b.

In the touch substrate as shown in FIGS. 3a-3b, by making the orthographic projection of the source-drain signal line 306 on the substrate 300 at most cover an orthographic projection of one of the first side S1 and the second side S2 of the gate signal line 302 on the substrate 300 in an intersection region where the orthographic projection of the touch signal line 310 on the substrate 300 intersects with the orthographic projections of the gate signal line 302 and the source-drain signal line 306 on the substrate 300, the mismatch gap of the touch signal line 310 between the intersection region and the non-intersection region can be decreased, so as to avoid or at least reduce the crossover open in the touch signal line 310 and improve the reliability of the touch substrate, while still realizing good attachment between the touch substrate and an upper substrate. Moreover, decreasing the mismatch gap helps to reduce the difficulty and risk of a film formation process, and reduce the failure of wiring due to climbing, such as disconnection of the wiring or a short circuit between wirings of different layers. In addition, a small mismatch gap helps to avoid scratches and defects associated with electrostatic discharge, thereby increasing the product yield.

Figure 4A:
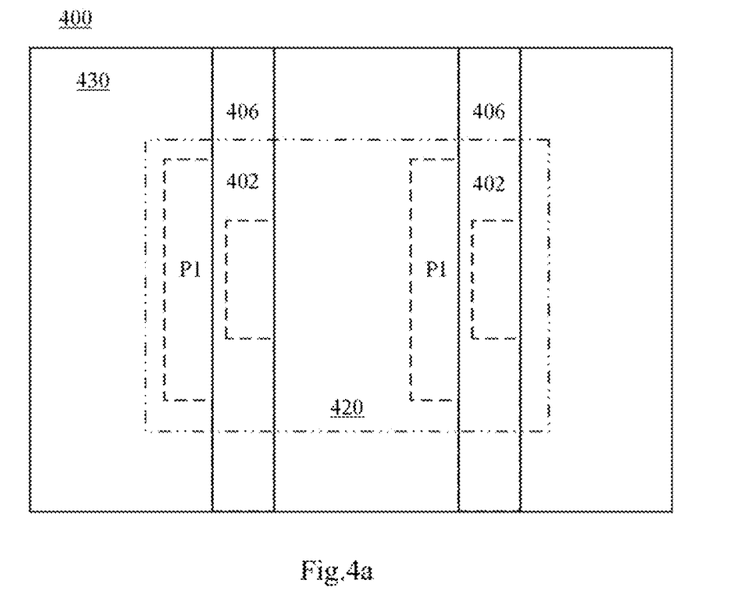
FIG. 4a is a top view that schematically illustrates an arrangement of a gate signal line and a source-drain signal line in a non-display area according to embodiments of the present disclosure.
Figure 4B:
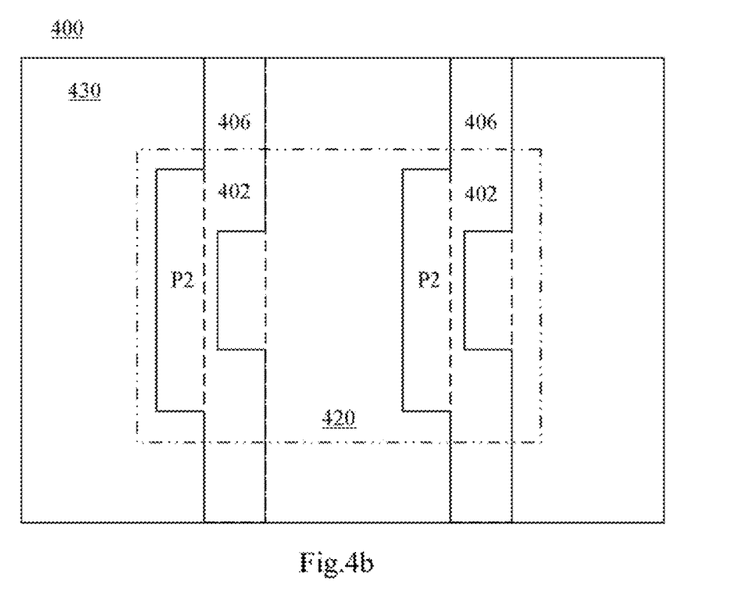
FIG. 4b is a top view that schematically illustrates an arrangement of a gate signal line and a source-drain signal line in a non-display area according to embodiments of the present disclosure.
Figure 4C:
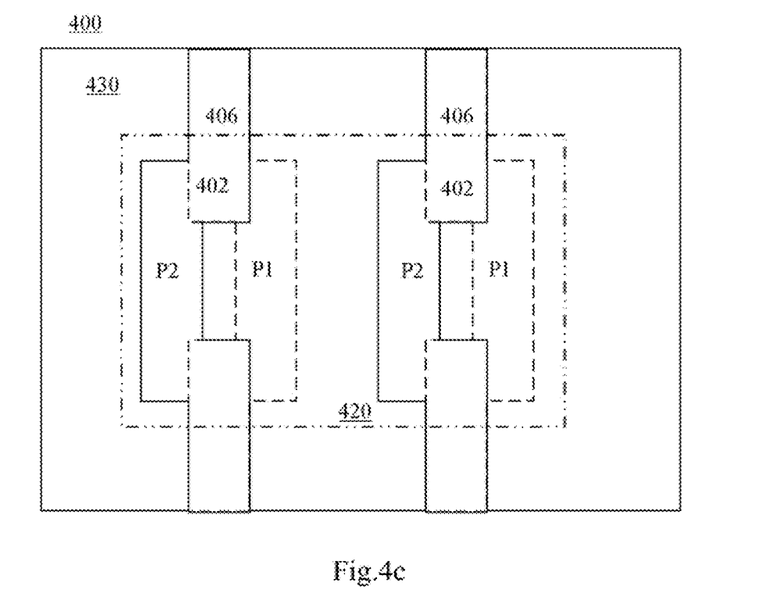
FIG. 4c is a top view that schematically illustrates an arrangement of a gate signal line and a source-drain signal line in a non-display area according to embodiments of the present disclosure.

FIGS. 4a-4c are top views schematically illustrating arrangements of a gate signal line and a source-drain signal line in a non-display area according to embodiments of the present disclosure. In FIGS. 4a-4c, other structures of the non-display area are omitted for the sake of simplicity and clarity, and only arrangements of the gate signal line and the source-drain signal line is shown. As shown in FIGS. 4a-4c, in a non-display area 400, the extending direction of a gate signal line 402 is parallel to that of a source-drain signal line 406. In the display area of the touch substrate, the gate signal line and the source-drain signal line are generally arranged in an intersecting manner. However, in the non-display area of the touch substrate, making the extending direction of the gate signal line parallel to that of the source-drain signal line can simplify electrical connections between a peripheral control circuit, and the gate signal line and the source-drain signal line, and decrease the wiring complexity of the non-display area, while realizing good attachment between the touch substrate and the upper substrate. It is to be noted that the gate signal line 402 is illustrated with a dashed line and the source-drain signal line 406 is illustrated with a solid line because the gate signal line 402 is disposed below the source-drain signal line 406. In a region 430 of the non-display area 400 other than the intersection region 420 (i.e., a non-intersection region 430, indicated by a dotted line frame), orthographic projections of the gate signal line 402 and the source-drain signal line 406 on the substrate overlap each other. In the intersection region 420, the gate signal line 402 is offset with respect to the source-drain signal line 406 in a direction perpendicular to the extending direction of the gate signal line 402 (i.e. horizontal direction in the orientation of FIG. 4a). As noted above, when the orthographic projections of the gate signal line and the source-drain signal line on the substrate overlap each other, the light-transmitting area of the non-display area can be maximized, which can further enhance the attaching effect between the touch substrate and the upper substrate. Moreover, in terms of fabrication, when the orthographic projections of the gate signal line and the source-drain signal line on the substrate overlap each other, the gate signal line and the source-drain signal line can be fabricated using mask of same pattern, thereby decreasing the complexity of fabrication.

Specifically, as shown in FIG. 4a, in the region 430 of the non-display area 400 other than the intersection region 420, the gate signal line 402 is straight along the extending direction of the gate signal line 402, and in the intersection region 420, the gate signal line 402 has a lateral protrusion P1.

Alternatively, as shown in FIG. 4b, in the region 430 of the non-display area 400 other than the intersection region 420, the source-drain signal line 406 is straight along the extending direction of the source-drain signal line 406, and in the intersection region 420, the source-drain signal line 406 has a lateral protrusion P2.

Alternatively, as shown in FIG. 4c, in the region 430 of the non-display area 400 other than the intersection region 420, the gate signal line 402 and the source-drain signal line 406 are straight along their own extending directions, and in the intersection region 420, the gate signal line 402 and the source-drain signal line 406 have lateral protrusions P1 and P2 respectively, which protrude in opposite directions.

It is to be noted that, and as will be readily appreciated by those skilled in the art, though FIGS. 4a and 4b illustrate the lateral protrusions offset in the left direction, the lateral protrusions may also be offset in the right direction. Moreover, the lateral protrusions are not limited to the rectangular shapes shown in FIGS. 4a-4c, but may take any technologically achievable shape, such as a semicircular shape, a trapezoidal shape, and the like.

In practice, the offset may be at least 20% of the width of the gate signal line, and the gate signal line and the source-drain signal line may have the same width.

Figure 5:
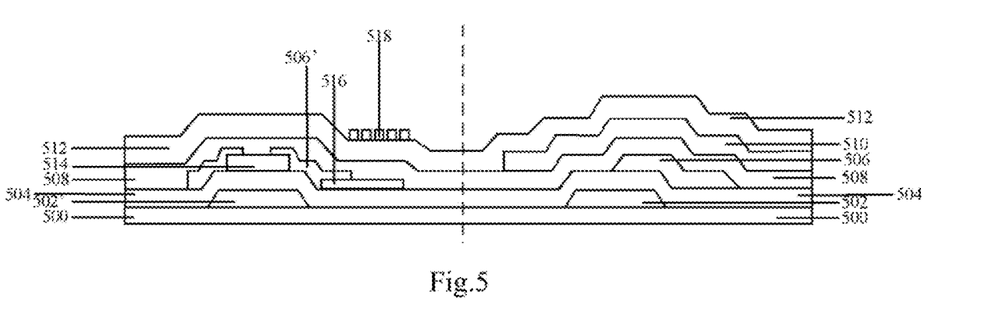
FIG. 5 schematically illustrates a sectional view of a touch substrate according to embodiments of the present disclosure, wherein a display area and a non-display area of the touch substrate are shown.

FIG. 5 schematically illustrates a sectional view of a touch substrate according to embodiments of the present disclosure, including a display area (shown on the left side of the dotted line) and a non-display area (shown on the right side of the dotted line) of the touch substrate.

Similar to FIGS. 3a-3b, the non-display area includes a substrate 500, a gate signal line 502 disposed on the substrate 500, a source-drain signal line 506 disposed above the gate signal line 502 and electrically insulated therefrom, and a touch signal line 510 disposed above the source-drain signal line 506 and electrically insulated therefrom. The non-display area further includes: a gate insulating layer 504 disposed between the gate signal line 502 and the source-drain signal line 506, wherein the gate signal line 502 and the source-drain signal line 506 are electrically insulated from each other by the gate insulating layer 504; a first passivation layer 508 disposed between the source-drain signal line 506 and the touch signal line 510, wherein the source-drain signal line 506 and the touch signal line 510 are electrically insulated from each other by the first passivation layer 508; and a second passivation layer 512 disposed on the touch signal line 510 for protecting the touch substrate.

Similar to the non-display area, the display area also includes a substrate 500, a gate insulating layer 504 disposed above the substrate 500, a first passivation layer 508 disposed above the gate insulating layer 504, and a second passivation layer 512 disposed above the first passivation layer 508. However, the display area further includes a gate metal layer 502' disposed between the substrate 500 and the gate insulating layer 504, wherein the gate metal layer 502' and the gate signal line 502 in the non-display area may be formed with the same material in the same layer; an active layer 514 disposed between the first passivation layer 508 and the second passivation layer 512; a source-drain metal layer 506' disposed on two sides of active layer 514, wherein the source-drain metal layer 506' and the source-drain signal line 506 in the non-display area may be formed with the same material in the same layer; a pixel electrode layer 516 disposed between the gate insulating layer 504 and the first passivation layer 508 and connected to the source-drain metal layer 506'; and a touch electrode 518 disposed on the second passivation layer 512, wherein the touch electrode 518 is electrically connected to the touch signal line 510 in the non-display area so as to transmit a touch signal sensed by the touch electrode to an analysis chip. When the touch substrate performs a display function, the touch electrodes 518 may be multiplexed into a common electrode, thereby simplifying the structure of the touch substrate.

Advantageously, the touch electrode 518 includes a transparent conductive material, and the first passivation layer 508 and the second passivation layer 512 include a transparent insulating material. The material of the touch electrode 518 includes a transparent metal, a transparent metal alloy, a transparent metal oxide, carbon nanotubes, graphene, and the like. The material of the first passivation layer 508 and the second passivation layer 512 includes an inorganic material such as silicon oxide ($SiO_2$), silicon nitride ($SiN_x$), silicon oxynitride ($SiO_xN_y$), and the like, as well as an organic material such as resin.

Embodiments of the present disclosure further provide a touch screen comprising any of the touch substrates described above. Such a touch screen can be applied to various display devices, for example, any product or component having a display function such as a mobile phone, a tablet computer, a television, a monitor, a notebook computer, a digital photo frame, a navigator, an electronic paper, and the like.

Figure 6:
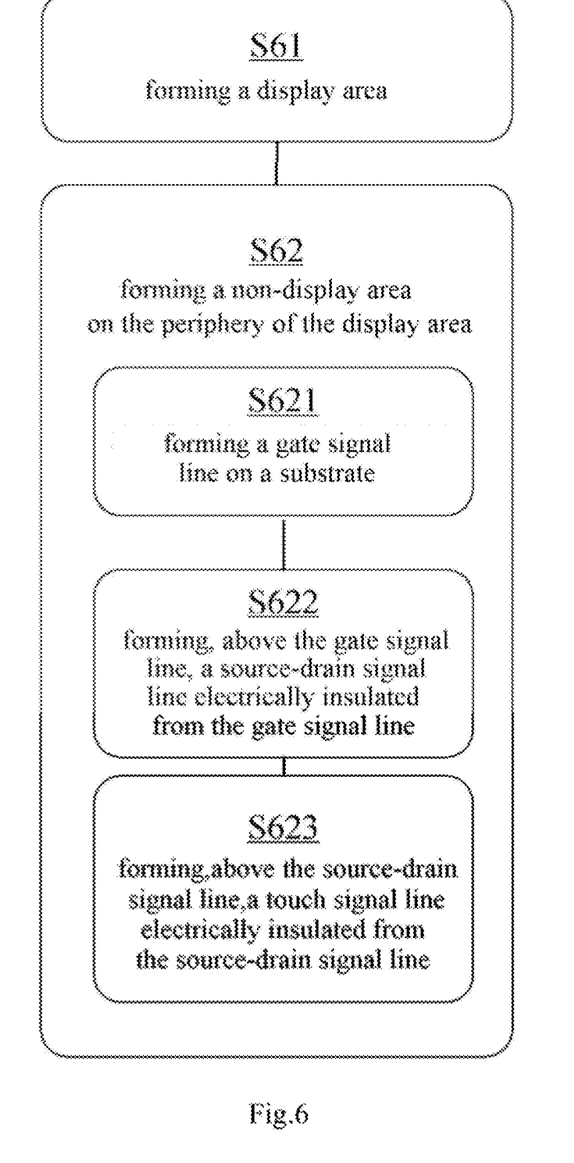
FIG. 6 is a flowchart of a method for manufacturing a touch substrate according to embodiments of the present disclosure.

Embodiments of the present disclosure further provide a manufacturing method for a touch substrate. As shown in FIG. 6, the manufacturing method comprises forming a display area at step S61, and forming a non-display area on the periphery of the display area at step S62. The step S62 of forming a non-display area comprises sub-steps of: at sub-step S621, forming a gate signal line on a substrate, the gate signal line having a first side and a second side opposite to each other in a direction perpendicular to the extending direction of the gate signal line; at sub-step S622, forming, above the gate signal line, a source-drain signal line electrically insulated from the gate signal line; at sub-step S623, forming, above the source-drain signal line, a touch signal line electrically insulated from the source-drain signal line, so that an orthographic projection of the touch signal line on the substrate intersects with orthographic projections of the gate signal line and the source-drain signal line on the substrate, respectively, and in an intersection region where the orthographic projection of the touch signal line on the substrate intersects with the orthographic projections of the gate signal line and the source-drain signal line on the substrate, the orthographic projection of the source-drain signal line on the substrate at most covers an orthographic projection of one of the first side and the second side of the gate signal line on the substrate.

In an exemplary embodiment, the sub-step S621 of forming a gate signal line comprises: depositing a gate metal layer on a substrate; coating a photoresist on the gate metal layer, forming a photoresist pattern by exposure and development; and forming a pattern of the gate signal line on the substrate by wet etching using the photoresist pattern as a mask.

In an exemplary embodiment, the gate signal line, the source-drain signal line, and the touch signal line are made of aluminum or molybdenum.

Embodiments of the present disclosure provide a touch substrate, a manufacturing method thereof, and a touch screen. In such a touch substrate, by making the orthographic projection of the source-drain signal line on the substrate at most cover an orthographic projection of one of the first side and the second side of the gate signal line on the substrate in an intersection region where the orthographic projection of the touch signal line on the substrate intersects with the orthographic projections of the gate signal line and the source-drain signal line on the substrate, the mismatch gap of the touch signal line between the intersection region and the non-intersection region can be decreased, so as to avoid or at least reduce the crossover open in the touch signal line and improve the reliability of the touch substrate, while still realizing good attachment between the touch substrate and the upper substrate. Moreover, decreasing the mismatch gap helps to reduce the difficulty and risk of film formation process, and reduce the failure of wiring due to climbing, such as disconnection of the wiring or a short circuit between wirings of different layers. In addition, a small mismatch gap helps to avoid scratches and defects associated with electrostatic discharge, thereby increasing the product yield.

Unless defined otherwise, technical terms or scientific terms used in the present disclosure have common meanings as understood by those ordinarily skilled in the art to which the present disclosure pertains. The words "first", "second", and the like used in the present disclosure do not denote any order, quantity, or importance, but rather merely serve to distinguish between different components. Similarly, the words "a", "an", "the", and the like do not denote a limitation of quantity but mean that at least one exists. The words "including", "comprising" and the like mean that the presence of an element or item preceding the word encompasses elements or items listed after the word and their equivalents, without excluding other elements or items. The word "connection" or "connected" and the like are not limited to physical or mechanical connections, but may include electrical connections, regardless of being direct or indirect. The words "upper", "lower", "left", "right" and the like are only used to denote relative positional relationships. When the absolute position of a described object is changed, the relative positional relationship may also be changed accordingly. It is to be noted that the features in the above embodiments can be used in any combination in the case of causing no conflict.

What have been stated above are only part of specific embodiments of the present disclosure, while the scope of the present disclosure is not so limited. Variations or replacements that can be easily conceived by any ordinarily skilled person in the art within the technical scope revealed by the present disclosure shall be encompassed within the scope of the present disclosure. Thus, the protection scope of the present disclosure shall be determined by the scope of the appended claims.

The invention claimed is:

1. A touch substrate comprising:
a display area; and
a non-display area on the periphery of the display area, wherein the non-display area includes:
  a substrate;
  a gate signal line disposed on the substrate, the gate signal line having a first side and a second side opposite to each other in a direction perpendicular to an extending direction of the gate signal line;
  a source-drain signal line disposed above the gate signal line and electrically insulated from the gate signal line; and
  a touch signal line disposed above the source-drain signal line and electrically insulated from the source-drain signal line,
  wherein in the non-display area,
  an orthographic projection of the touch signal line on the substrate intersects with orthographic projections of the gate signal line and the source-drain signal line on the substrate, respectively; and
  in an intersection region where the orthographic projection of the touch signal line on the substrate intersects with the orthographic projections of the gate signal line and the source-drain signal line on the substrate, the orthographic projection of the source-drain signal line on the substrate at most covers an orthographic projection of one of the first side and the second side of the gate signal line on the substrate;
  wherein in the non-display area, the extending direction of the gate signal line is parallel to an extending direction of the source-drain signal line; and
  wherein in regions of the non-display area other than the intersection region, the orthographic projections of the gate signal line and the source-drain signal line on the substrate overlap with each other.

2. The touch substrate according to claim 1, wherein in the intersection region, the gate signal line is offset with respect to the source-drain signal line in the direction perpendicular to the extending direction of the gate signal line.

3. The touch substrate according to claim 2, wherein the gate signal line is straight along the extending direction of the gate signal line in regions of the non-display area other than the intersection region, and has a lateral protrusion in the intersection region.

4. The touch substrate according to claim 2, wherein the source-drain signal line is straight along the extending direction of the source-drain signal line in regions of the non-display area other than the intersection region, and has a lateral protrusion in the intersection region.

5. The touch substrate according to claim 2, wherein the offset is at least 20% of a width of the gate signal line.

6. The touch substrate according to claim 1, wherein the gate signal line and the source-drain signal line have a same width.

7. The touch substrate according to claim 1, wherein the non-display area further includes:
  a gate insulating layer disposed between the gate signal line and the source-drain signal line, the gate signal line and the source-drain signal line being electrically insulated from each other by the gate insulating layer;
  a first passivation layer disposed between the source-drain signal line and the touch signal line, the source-drain signal line and the touch signal line being electrically insulated from each other by the first passivation layer; and
  a second passivation layer disposed on the touch signal line.

8. The touch substrate according to claim 1, wherein the display area includes:
  the substrate;
  a gate metal layer disposed on the substrate;
  a gate insulating layer disposed on the gate metal layer;
  an active layer and a pixel electrode layer disposed on the gate insulating layer;
  a source-drain metal layer disposed on the active layer;
  a first passivation layer disposed on the source-drain metal layer;
  a second passivation layer disposed on the first passivation layer;
  a touch electrode disposed on the second passivation layer,
  wherein,
  the gate metal layer and the gate signal line are arranged in a same layer,
  the source-drain metal layer and the source-drain signal line are arranged in a same layer, and
  the touch electrode is electrically connected to the touch signal line.

9. The touch substrate according to claim 8, wherein,
  the touch electrode includes a transparent conductive material; and
  the first passivation layer and the second passivation layer include a transparent insulating material.

10. A touch screen comprising the touch substrate according to claim 1.

11. The touch screen according to claim 10, wherein in the intersection region, the gate signal line is offset with respect to the source-drain signal line in the direction perpendicular to the extending direction of the gate signal line.

12. The touch screen according to claim 11, wherein the gate signal line is straight along the extending direction of the gate signal line in regions of the non-display area other than the intersection region, and has a lateral protrusion in the intersection region.

13. The touch screen according to claim 11, wherein the source-drain signal line is straight along the extending direction of the source-drain signal line in regions of the non-display area other than the intersection region, and has a lateral protrusion in the intersection region.

* * * * *